United States Patent [19]

Geary, Jr. et al.

[11] Patent Number: 5,194,106

[45] Date of Patent: Mar. 16, 1993

[54] METHOD OF MAKING FIBER REINFORCED POROUS SHEETS

[75] Inventors: James E. Geary, Jr., Boothwyn, Pa.; Gregory P. Weeks, Hockessin, Del.

[73] Assignee: E. I. Du Pont de Nemours and Company, Wilmington, Del.

[21] Appl. No.: 833,040

[22] Filed: Feb. 10, 1992

Related U.S. Application Data

[62] Division of Ser. No. 606,651, Oct. 31, 1990, Pat. No. 5,134,016.

[51] Int. Cl.$^5$ .................................................. B32B 5/16
[52] U.S. Cl. ................................. 156/62.6; 156/62.8; 156/242; 156/283; 156/290; 156/296; 428/198
[58] Field of Search ...................... 156/62.6, 62.8, 242, 156/290, 296, 283; 428/198

[56] References Cited

U.S. PATENT DOCUMENTS

| | | | |
|---|---|---|---|
| 2,568,144 | 9/1951 | Cremer et al. | 154/101 |
| 2,784,132 | 5/1953 | Maisel | 154/54 |
| 2,972,554 | 2/1961 | Muskat et al. | 117/76 |
| 3,117,055 | 1/1964 | Guandique et al. | 161/170 |
| 3,639,195 | 2/1972 | Sanders | 156/62.6 |
| 4,483,897 | 11/1984 | Fujimura et al. | 428/288 |
| 4,520,066 | 5/1985 | Athey | 428/288 |
| 4,543,288 | 9/1985 | Radvan | 428/297 |
| 4,551,378 | 11/1985 | Carey, Jr. | 428/198 |
| 4,590,114 | 5/1986 | Holtman | 428/171 |
| 4,684,120 | 8/1987 | Kamal | 271/18.3 |
| 4,690,860 | 9/1987 | Radvan et al. | 428/290 |
| 4,734,321 | 3/1988 | Radvan et al. | 428/283 |
| 4,767,321 | 8/1988 | Chilva | 432/59 |
| 4,793,802 | 12/1988 | Chilva | 432/59 |
| 4,818,599 | 4/1989 | Marcus | 428/288 |
| 4,882,114 | 11/1989 | Radvan et al. | 264/129 |
| 4,902,542 | 2/1990 | Minegishi et al. | 428/198 |
| 4,917,943 | 4/1990 | Tesch | 428/288 |
| 4,944,992 | 7/1990 | Yoneshige et al. | 428/198 |
| 5,057,168 | 10/1991 | Muncrief | 156/62.6 |

FOREIGN PATENT DOCUMENTS 0148762 7/1986 European Pat. Off.

*Primary Examiner*—Caleb Weston

[57] ABSTRACT

A method of preparing porous fiber reinforced polymer composite sheets has been developed to allow a more efficient preheating of the sheel prior to molding and includes the steps of blending reinforcing fibers with resin matrix forming fibers to form a web. This web is then heated to a temperature wherein the resin matrix forming fibers melt and envelope the reinforcing fibers, tacking them together at crossover points. The resultant web can then be directly heated very efficiently for molding. This web is highly porous allowing rapid heating at moderate pressure differentials during subsequent preheat steps. The microstructure created when the resin matrix forming fibers are initially melted further enhances heating capability because the structure retains porosity during the subsequent heating step required for molding. Because the resin matrix forming fibers initially were uniformly blended, a highly uniform distribution of polymeric material within the reinforcing fiber matrix yields molded parts with very uniform properties.

4 Claims, 1 Drawing Sheet

METHOD OF MAKING FIBER REINFORCED POROUS SHEETS

This is a division of application Ser. No. 07/606,651 filed Oct. 31, 1990, now U.S. Pat. No. 5,134,016.

BACKGROUND OF THE INVENTION

This invention relates to fiber-reinforced porous thermoplastic sheets and, more particularly, to such sheets for use in the production of fiber-reinforced thermoplastic resin articles.

Thermoplastic sheet material is widely used in manufacturing molded articles These sheets are frequently reinforced with fiber to increase the strength and rigidity for many applications. One such sheet material is described in U.S. Pat. No. 4,734,321. This patent describes an air permeable sheet-like structure comprised of reinforcing fibers bonded with unconsolidated particulate plastic material for use in molding articles. Prior to molding, this porous sheet may be preheated by hot air permeation for homogeneous heating of the whole structure. A process for forming permeable sheet material useful for molding is described in U.S. Pat. No. 4,882,114. In this patent the porous sheet is made by laying down and draining a foamed aqueous dispersion of discrete fibers and unconsolidated thermoplastic or thermosetting particulate and drying the formed web. The resultant web is preheated and compression molded to form a shaped fiber reinforced plastic article. During the preheating step prior to molding, enough heat must be provided to melt the plastic particulates so that they will flow during the molding step. In a hot air convection oven, the heat delivered to the composite porous sheet is dependent upon the mass flow of heated air through the medium being heated and mass flow depends upon heating time and the pressure drop across the sheet. These last two parameters are inversely related; a low pressure drop requires a long heating time and to achieve short heating times a large pressure differential is required. The design of the heating oven becomes far more complex and expensive when high pressure differentials are required. For economic reasons, it is desirable to keep the required pressure differential below 10"H₂O, preferably below 6"H₂O. To attain the appropriate heat delivery to the sheet then, a longer heating time is necessary. However, long heating time is similarly undesirable because exposing polymers to elevated temperatures promotes polymer degradation. Degradation is a time at temperature relationship. To avoid degradation it is important to minimize the time the polymer is exposed to high temperatures.

SUMMARY OF THE INVENTION

A method of preparing an air permeable web of randomly disposed fibers held together at fiber crossover locations by globules of thermoplastic resin has been developed to allow a more efficient preheating of the web prior to molding. In this method, high modulus reinforcing fibers are blended with resin matrix forming polymer fibers to form a web by any suitable method such as air lay, wet lay, carding, etc. This web is then heated to a temperature sufficient to melt the resin matrix forming fibers. Upon melting, the resin matrix forming fibers envelope the reinforcing fibers, tacking them together at crossover points. The resultant web can then be directly heated very efficiently for molding.

This web is highly porous allowing rapid heating at moderate pressure differentials during subsequent preheat steps. The microstructure created when the resin matrix forming fibers are initially melted further enhances heating capability because the structure retains porosity during the subsequent heating step required for molding. Furthermore, because the resin matrix forming fibers initially were uniformly blended with the high modulus reinforcing fibers, the polymeric resin globules are uniformly and intimately mixed with the reinforcing fibers.

This method of preparing a porous fiber reinforced polymer composite sheet useful when dealing with any polymers including but not limited to polyesters, copolyesters, polyamides, polymethylphenylene, polyarylates, polyvinylidene fluoride, polyethylene and polypropylene. It is particularly useful when preparing sheets containing condensation polymers such as polyesters, copolyesters and polyamides because condensation polymers are subject to rapid hydrolysis. Therefore, when utilizing condensation polymers, the water molecules must be driven out of the polymer prior to melting or else the molecular weight will decrease resulting in lowered toughness. To avoid hydrolysis, a two-step preheat is commonly used. First a lower temperature drying step is utilized prior to subjecting to the high temperature required for the melt and mold steps. Because this improved method of preparing a fiber reinforced polymer composite sheet results in very small polymer globules, it is possible to simultaneously dry and melt. In essence, the water is driven out of the polymer prior to the melt.

Furthermore, utilizing this method to obtain the product described allows a rapid, large increase in molecular weight during the convection heating process when the matrix resin forming fiber is a condensation polymer. To achieve increased molecular weight, the heating is done in an inert atmosphere, such as nitrogen, argon, helium or the like. High molecular weight resins, when formed into useful parts, have the advantage of substantially higher toughness over the more common, intermediate molecular weight resins normally employed in industry. The manufacture of high molecular weight resins is quite expensive since a slow polymerization process is employed. This cost of polymerization is largely avoided by polymerizing as described above during the heating process prior to molding. Also, high molecular weight resins are quite viscous and it is very hard to create a uniform dispersion of reinforcing fiber in these resins. In the instant invention, the dispersion of reinforcing fibers in the resin and the wetting of the fiber by the resin is accomplished before molecular weight growth is initiated.

This invention provides a porous web or sheet product that:

can be produced by utilizing stable bulk web formation processes to obtain a self-binding sheet that can be further processed without the need for a costly consolidation step, can be very rapidly and efficiently heated at moderate pressure drops to equal or above the melting temperature of the polymeric component in subsequent processing, retains porosity during the process of forced convection heating, resulting in very efficient heat transfer and short heating times even when layered to produce batts with basis weights up to 2 lb./ft.², does not require a separate drying step when heating rapidly from room temperature to above the melting temperature as is required for molding, and is an intimate blend of resin matrix fibers and long reinforcing fibers with a variety of non-binder additives and fillers in both the resin fiber and in the interstices between the resin fibers and reinforcing fibers.

The web produced by this method is capable of being heated very rapidly and efficiently at moderate pressure drops to above the melting temperature of the resin matrix component. For condensation polymers, there is the further advantage of simultaneous drying and heating of the polymer, thus avoiding hydrolysis without sacrificing process efficiency. Finally, the molecular weight of the product may be increased during processing.

DETAILED DESCRIPTION

Figure 1:
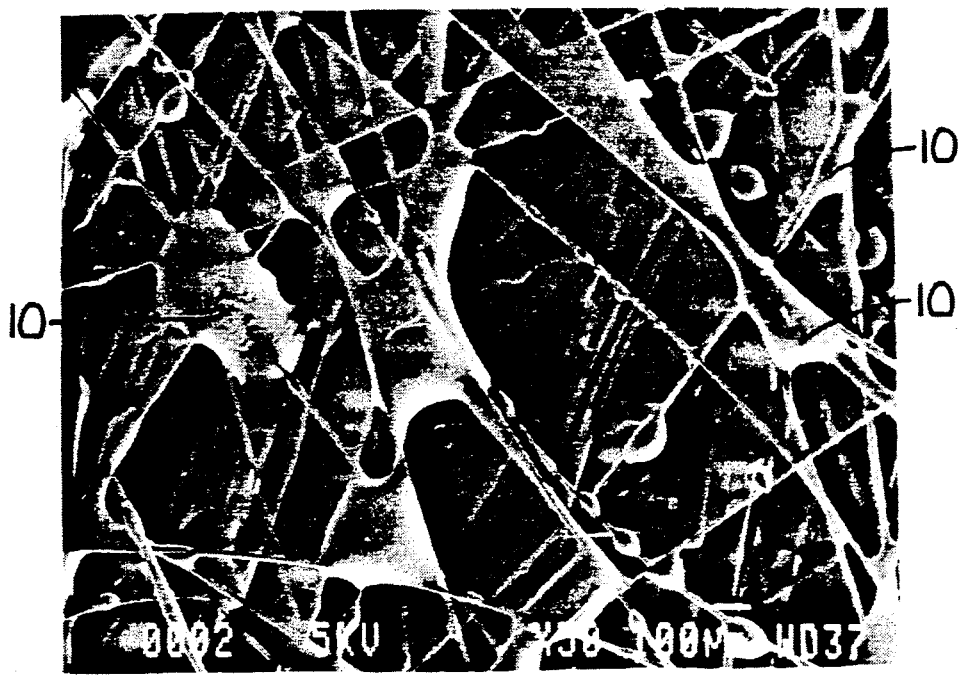
FIG. 1 is a photomicrograph of a web produced by this method.

The reinforcing fiber may be any high modulus fiber, such as polyamids, glass, carbon, polyesters and high temperature nylons. Modulus of at least 100,000 M Pascals is preferred. The reinforcing fibers may be of consistent length or a mixture of variable length fibers. Generally, long fibers in the range of one to eight centimeters are preferred because they result in superior final products.

The thermoplastic resin matrix forming fibers may be any thermoplastic or combination of several suitable for the application. Examples of suitable thermoplastics include, but are not limited to, polyethylene, polypropylene, polyesters, copolyesters, ABS, polyamids, including Nylon 6, Nylon 6/6, Nylon 11, Nylon 12 and J2, polyetheretherketone (PEEK), polyetherketoneketone (PEKK), polymethylphenylene, polyarylates and polyvinylidene fluoride. The denier and length of the thermoplastic fiber is chosen such that the volume of a single fiber is within a certain range, preferably between $1.5 \times 10^{-4}$ to $10 \times 10^{-3}$ mm$^3$ which when heated results in globule volume in the range of approximately $0.5 \times 10^{-4}$ to $1 \times 10^{-3}$ mm$^3$. Given the volume range then, the thermoplastic fiber diameter is generally chosen based on economic considerations. For instance, the most economical polyester staple is 1.5 denier per filament (DPF). To achieve a volume within the preferred range, ¼ inch long, 1.5 DPF filaments are appropriate. However, other deniers may be preferred for certain applications and will work equally well as long as the volume range is respected. In general, a length of 1-50 mm and diameter of greater than 0.5 DPF is preferred.

The web is formed by any conventional means, including wet lay, air lay, carding, etc. The blend consists of 20-60% by weight of the reinforcing fiber and 40-80% by weight of the thermoplastic fiber.

The basis weight of the formed web is in the range of 0.05-0.2 pound per square foot. The formed web is passed through a convection heating oven. Air flows perpendicular to the plane of the web at an air temperature above the melting temperature of the polymeric staple fibers to remove residual moisture and melt individual staple fibers to form globules that wet the reinforcing fibers, bridging cross-overs and forming bead-like drops on other reinforcing fibers. This melting step is the key to producing a web with substantial tensile strength that is sufficient for normal web handling, winding and sheeting operations without the need for a separate binder material. The melting step is also critical to obtaining a web that has the high porosity desired for subsequent convection heating in preparation for molding. Porosity is preferably greater than 250 cfm as measured by the Frazer porosity test for a single sheet of 60% polypropylene/40% glass with a basis weight of 0.1 pound per square foot or greater than 175 cfm for a single sheet of 60% PET/40% glass with a basis weight of 0.32 pound per square foot.

The mat is then cooled well below the melting temperature of the polymer in a condition where no external pressure is applied to the web so the polymer globules are free to form primarily under the influence of surface tension due to the wetting of the reinforcing fibers and air-polymer surface tension so that the resulting web is self-supporting and all thermoplastic globules are well adhered to the structure.

The resulting product web is particularly adapted to subsequent forced convection heating when it is used as a thermal compression molding material. When stacked in multiple layers to provide a suitable charge for thermal compression molding, it has high porosity, permitting the use of forced convection heating at pressure drops less than 10 inches of water and remains porous, resisting collapse throughout the heating process. Typical heating times to the molding temperature for stacked layers of this material with total basis weight of approximately 0.43 pound per square foot for PET and glass and 0.29 pound per square foot for polypropylene and glass are 15-30 seconds.

As mentioned above, when the resin used is a condensation polymer, the small globule size of the individual resin entities allows simultaneous drying and heating, thus avoiding loss of molecular weight due to hydrolysis without the need for a separate drying step. Furthermore, an increase in resin polymer molecular weight can be obtained if desired by heating in an inert atmosphere using gases such as nitrogen, helium, argon, etc.

Figure 2:
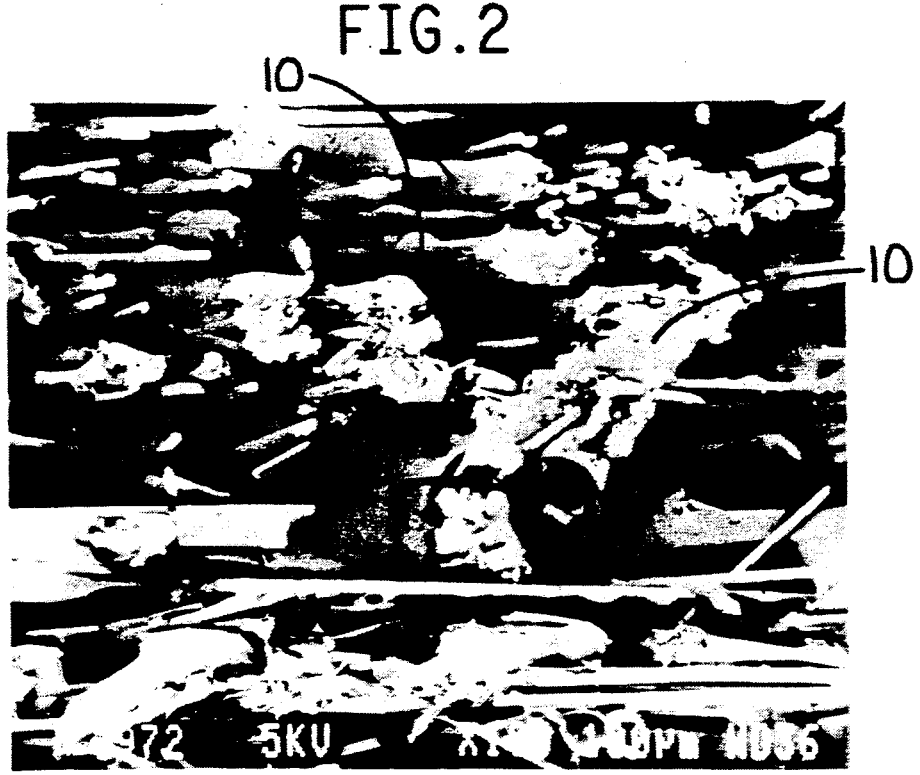
FIG. 2 is a photomicrograph of an end view of the web produced by this method.

The globules 10 formed are not necessarily spherical in shape as the term globule may imply. Rather, they are really lumps of previously molten thermoplastic material as can be seen in FIG. 1. This figure depicts the X-Y plane view of the structure. There is also a Z-directionality to the globules, depicted in FIG. 2. In general, the globules tend to be larger in the X and Y directions and minimized in the Z, though that is not necessary. For the simultaneous drying and heating desirable for condensation polymers as described above, the minimum dimension, generally the Z, should be less than 10 mils. If the minimum dimension dxcdeds 10 mils, some moisture can remain within the polymer and lead to hydrolysis.

EXAMPLE 1

A wet-laid sheet consisting of 60% by weight 0.25", 1.5 DPF PET fibers and 40% by weight 1", 13 um diameter glass fibers and containing a concentration of 0.50% antioxidant (Irganox 1010) was prepared. The Gurley porosity of the sheet was measured at 323 cfm with a basis weight of 0.101 pound per square feet. Sheets were stacked to a final thickness of 1.4" and basis weight 1.27 pound per square foot. The batt was preheated in 310° C. air using a pressure differential of 5.0 in. H$_2$O. A heating time of 30 seconds was required to bring the batt to molding temperature. The batt was next molded into a reduced size standard quality control box. The final tensile strength was 29,290 kpsi, the tensile modulus was 1,963,000 psi and the elongation at break was 2.01%. The molecular weight increased from 21,698 initially to a final value of 22,144.

EXAMPLE 2

A wet-laid sheet consisting of 60% by weight 0.25", 1.5 DPF PET fibers and 40% by weight 1", 13 um diameter glass fibers and containing no antioxidant was prepared. The porosity of the sheet was measured at 257.5 cfm with a basis weight of 0.174 pound per square foot. Sheets were stacked to a final thickness of 1.8"and basis weight 1.27 pounds per square foot. No preheating of the batt was done, therefore, the resin remained in fiber form. The batt was heated in 300° C. air using a pressure differential of 5.0 in. $H_2O$. A heating time of 125 seconds was required to bring the batt to molding temperature. The batt was then molded into a standard quality control box. The final tensile strength was 19,650 kpsi, the tensile modulus was 1,437,000 psi and the elongation at break was 1.76%. The molecular weight was 19,724 initially and 27,400 after molding. The part did not completely fill the mold, indicating that the 125 seconds was not actually sufficient to heat the entire batt.

EXAMPLE 3

A wet-laid sheet consisting of 59.4% by weight 0.39", 5 DPF polypropylene fibers and 40% by weight 1", 13 um diameter glass fibers and containing a concentration of 0.25% antioxidant (Hercules) was prepared. The porosity of the sheet was measured at 290 cfm with a basis weight of 0.093 pound per square foot. The batt was preheated to obtain the morphology described above, i.e. the resin was present in globules. The batt was heated in 232° C. air using a pressure differential of 5.0 in. $H_2O$. A heating time of 15 seconds was required to bring the batt to molding temperature. The batt was then molded into a reduced size standard quality control box. The final tensile strength was 13,760 kpsi, the tensile modulus was 821,000 psi and the elongation at break was 2.96%.

EXAMPLE 4

A wet-laid sheet consisting of 60% by weight 0.25", 1.5 DPF PET fibers and 40% by weight 1", 13 um diameter glass fibers and containing no antioxidant was prepared. The sheet was heated with in 300° C. nitrogen moving through the sheet perpendicular to its plane at a velocity of 90. fpm for 300 seconds. The molecular weight increased from 18,000 initially to a final value of 62,000.

In the examples above, the mold pressure was typically 2,000 psi. In the case of PET, the mold temperature was in the range of 150–160° C. and the close time was approximately 45 seconds. Material weight ranged from 560–600 grams. For polypropylene, the mold temperature was in the range of 50–60° C. and the close time was approximately 30 seconds.

What is claimed is:

1. A process for preparing a web of randomly dispersed fibers comprising: blending 20–60% by weight of discrete high modulus fibers between 1–8 cm in length and 40–80% by weight of thermoplastic resin matrix forming fibers greater than 0.5 denier and between 1 and 50 mm in length; forming a web of said blend, said web having a basis weight of from about 0.05 to about 0.2 pound per square foot; heating said web in a first heating step to melt said thermoplastic resin matrix forming fibers; forming molten globules of thermoplastic polymer, said globules enveloping said high modulus fibers at fiber crossover locations and adhering to said high modulus fibers along their length; and cooling said web to bond said high modulus fibers into an air permeable structure.

2. The process as defined in claim 1 including the step of heating said web in a second heating step to melt said globules; and molding said batt into an article.

3. The process as defined in claim 1 wherein a plurality of said webs are stacked one on the other to form a batt, then heating said batt in a second heating step to melt said globules; and molding said web into an article.

4. The process as defined in claim 1 wherein said heating step is forced convection heating.

* * * * *